J. F. STEDMAN.
CUTTER HEAD.
APPLICATION FILED SEPT. 18, 1908.
932,345.
Patented Aug. 24, 1909.
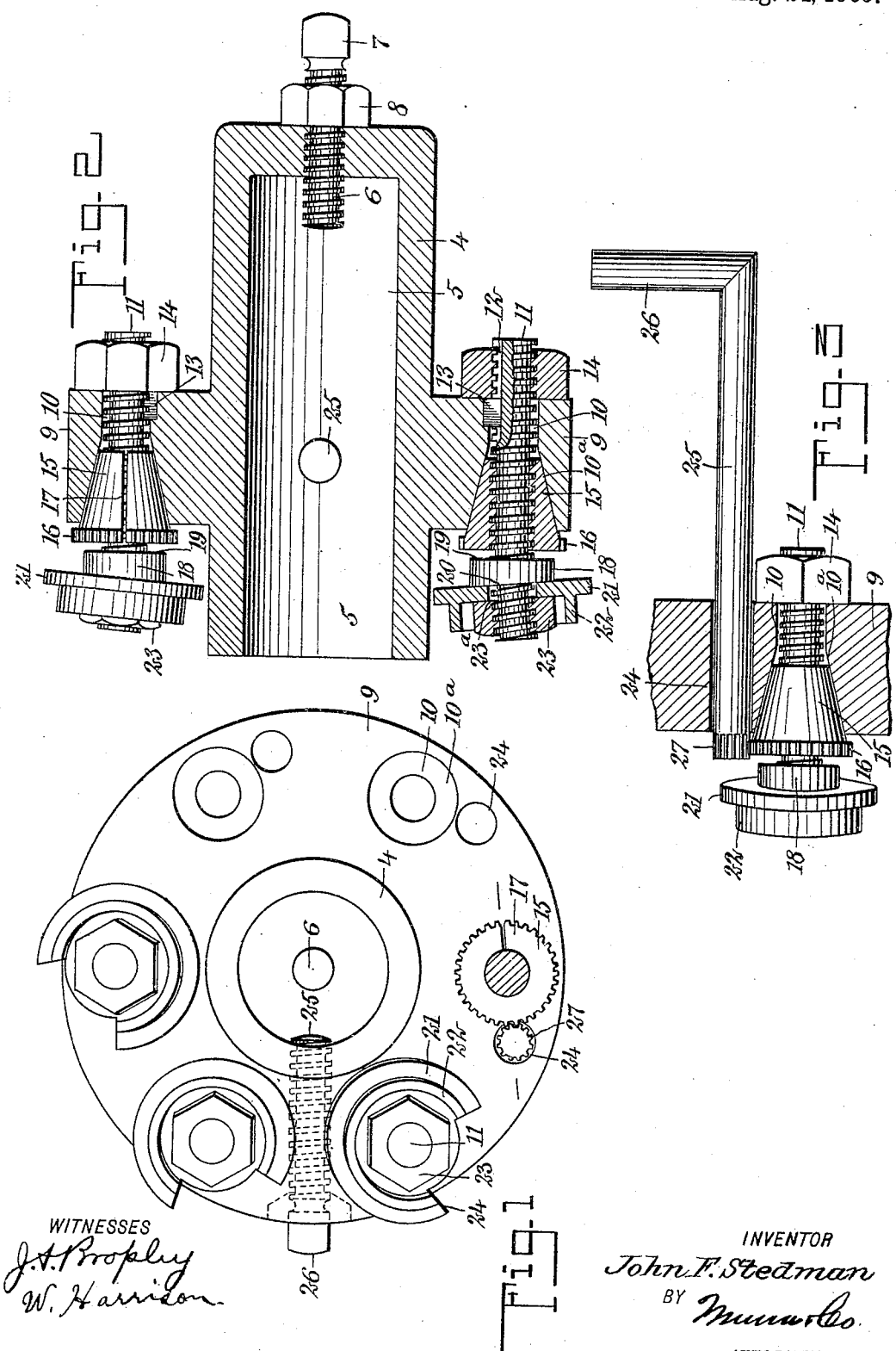
WITNESSES
J. A. Brophy
W. Harrison
INVENTOR
John F. Stedman
BY Munn & Co.
ATTORNEYS

UNITED STATES PATENT OFFICE.

JOHN F. STEDMAN, OF NEWBERG, OREGON.

CUTTER-HEAD.

932,345.      Specification of Letters Patent.      Patented Aug. 24, 1909.

Application filed September 18, 1908. Serial No. 453,604.

*To all whom it may concern:*

Be it known that I, JOHN F. STEDMAN, a citizen of the United States, and a resident of Newberg, in the county of Yamhill and State of Oregon, have invented a new and Improved Cutter-Head, of which the following is a full, clear, and exact description.

My invention relates to cutter heads, my more particular purpose being to provide an improved mounting for securing the cutters upon the cutter head in such a manner that the cutters may be readily attached and detached at will, and may also be adjusted as desired, without removing them from the cutter head.

My invention further relates to improvements in the mountings for cutter heads, for the purpose of increasing the general efficiency of the same.

Reference is to be had to the accompanying drawings, forming a part of this specification, in which similar characters of reference indicate corresponding parts in all the figures, and in which—

Figure 1 is an inverted plan of a cutter head of my improved construction and carrying the cutters ready for work; Fig. 2 is a substantially central vertical section through the cutter head, showing how the cutters are mounted thereupon; and Fig. 3 is a fragmentary section showing the key for turning the conical cutter holders in order to set the cutters properly in position to do their work.

In the particular instance given, the cutter head is of the type used upon revoluble shafts employed in matching. This cutter head has substantially the form of an inverted cup and is mounted upon the upper end of the revoluble shaft, the cutters being mounted upon the cutter head and depending therefrom. A cylindrical barrel 4, having substantially the form of a cup, is provided with a cylindrical aperture 5 for receiving the revoluble shaft. A set screw 6 extends through the upper end of the barrel and is provided with a head 7, and fitted upon the set screw 6 is a revoluble nut 8. The lower end of the set screw engages the revoluble shaft. By turning the set screw, therefore, the general position of the cutter head relatively to the revoluble shaft may be controlled at will. After the set screw is properly adjusted, it is tightened by aid of the nut 8, which, therefore, serves as a lock for the set screw.

The barrel 4 is provided with a flange 9 integral with it. This flange is provided with a number of small holes 10, each enlarged at its lower end, thereby assuming a conoidal shape, due to the inclination of its walls 10ª, as will be understood from Fig. 1. A number of double-ended screws 11, of steel or other resilient metal, extend through the holes 10 and are each provided with a keyway 12. A number of keys 13 are set partly into the flange 9 and extend into the keyways 12. The keys 13 prevent the screws 11 from turning relatively to the flange 9. Revoluble nuts 14 encircle the screws 11 and by turning these nuts the screws 11 are raised or lowered, as desired, to practically any extent permitted by the length of the keyways 12. A number of nuts 15, each of conical form, are fitted against the respective surfaces 10ª. Each of these conical nuts 15 is provided with teeth 16, disposed around its peripheral lower edge, as will be understood from Fig. 2. Each conical nut 15 is further provided with a slot 17, whereby it is given a limited amount of resiliency and is rendered slightly compressible when forced upwardly into the flange 9. Each screw 11 is provided with an enlarged cylindrical portion 18, secured rigidly upon it, which portion is provided with a face 19 extending at a right angle to the axis of the screw 11. Each portion 18 is further provided with a face 20, which is inclined relatively to the face 19. The cutters are shown at 21, and are each provided with a flange 22. These cutters are held in position by aid of nuts 23, which are fitted upon the lower ends of the screws. These lower ends are bent slightly outwardly, as will be understood from Fig. 2. The lower end of each screw is thus inclined obliquely outwardly to an angle of four and one-half degrees, relatively to the general axis of the upper portion of the screw. Each cutter 21 is provided with an opening 23ª, whereby the threads of the screw are prevented from coming into direct engagement with the cutter 21, or, at least, the openings 23ª are large enough to leave a little clearance space around the screw 11, as will be understood from Fig. 2.

In order to mount the cutter upon a screw 11, the cutter is slipped over the lower end of the screw and lodged against the face 20, the nut 23 being next screwed into position, so as to jam the cutter firmly against said face, and thus hold the cutter secured in position. In order to set the cutter in a position favorable for its work, I provide the mechanism shown more particularly in Fig. 3. The flange 9 has a number of holes 24 extending entirely through it, and a key 25 is adapted to extend through any one of these holes. The lower end of the key is provided with teeth 27 integral with it, these teeth being adapted to mesh with the teeth 16 of the conical nut 15. The upper end of the key 25 is provided with a handle 26, whereby the key may be turned at will. All that is necessary in order to remove the screws 11 is to take off the nut 14. A cutter being mounted upon the screw, of course, comes off with it. The conical nut 15 is not removed in this case, and consequently there is no need to disturb the position of the cutter relatively to the screw.

The purpose of the key 25 is to enable the operator to adjust the cutters without removing the head from the shaft. This is done by first loosening the nut 14, then inserting the key through the hole 24 and turning the conical nut 15 so as to tighten the nut 14 upon the screw 11, thereby locking the parts firmly in position. The nut 14 must be loosened before the nut 15 can be turned.

In order to replace the cutter upon the cutter head, the use of the key is not necessary. The nut 14 being turned relatively to the screw 11, answers the purpose.

From the above description it will be noted that the cutters are adjustable independently of the position or condition of the head 4; so much so that any cutter may be adjusted without removing it from the flange 9, or in any wise disturbing either this flange or the cutter head carrying it. Any cutter may be removed at will or adjusted relatively to its screw 11, or any screw 11 may be adjusted vertically in relation to its mounting without any necessity for removing either the cutter or any other part carried by the cutter head.

The machine is adapted for use with cutters of practically any kind which might be secured in position by aid of a screw, or of any fastening member analogous to the latter. I do not limit myself to the particular shape of cutter head or of the flange carried by the same, neither do I limit myself to the particular mechanism carried by this flange and used in connection with the cutter.

Having thus described my invention, I claim as new and desire to secure by Letters Patent:

1. The combination of a cutter head provided with an opening, a conical nut fitting into said opening, a screw extending through said conical nut and through said opening, a cutter carried by said screw, and means for clamping said screw and said conical nut relatively to said cutter head.

2. The combination of a cutter head provided with a conical opening, a screw extending through said opening, a conical nut partially encircling said screw and extending into said conical opening, means for turning said conical nut relatively to said screw, a nut engaging said cutter head and said screw for the purpose of forcing said conical nut into said opening, and a cutter mounted upon said screw.

3. The combination of a revoluble cutter provided with an opening, a conical nut fitting into said opening and provided with a slot for rendering said conical nut resilient, a screw extending through said conical nut and adapted to be gripped tightly thereby, means for turning said conical nut relatively to said screw for the purpose of adjusting said screw, and a cutter mounted upon said screw.

In testimony whereof I have signed my name to this specification in the presence of two subscribing witnesses.

JOHN F. STEDMAN.

Witnesses:
GUST MINUTH,
R. B. LINVILLE.